United States Patent [19]
Hue

[11] Patent Number: 4,515,013
[45] Date of Patent: May 7, 1985

[54] APPARATUS FOR MEASURING THE VERTICAL ACCELERATION DUE TO THE SWELL

[75] Inventor: Jean-Pierre Hue, Brest, France

[73] Assignee: 501 Etablissement Public dit "Centre National d'Exploitation des Oceans" (CNEXO), Paris, France

[21] Appl. No.: 540,794

[22] Filed: Oct. 11, 1983

[30] Foreign Application Priority Data

Oct. 14, 1982 [FR] France .................................. 82 17584

[51] Int. Cl.³ ...................... G01P 15/00; G01M 10/00
[52] U.S. Cl. ................................................... 73/170 A
[58] Field of Search ....................................... 73/170 A

[56] References Cited

U.S. PATENT DOCUMENTS 3,769,838 11/1973 Buckler ............................. 73/170 A

OTHER PUBLICATIONS

"A System for the Routine Measurement of Directional Wave Spectra . . ." by Steele et al., from Oceans '78, The Ocean Challenge, pp. 614–621, Sep. 1978.

Primary Examiner—James J. Gill
Attorney, Agent, or Firm—Laff, Whitesel, Conte & Saret

[57] ABSTRACT

A buoy has accelerometers and magnetometers for measuring characteristics of an ocean swell. The main plane of the buoy floats on and follows the motion of the free surface of the ocean water. A first accelerometer and a magnetometer are mounted on the buoy and oriented along the axis which is perpendicular to the main plane of the buoy (i.e. perpendicular to the surface of the ocean swell). A pair of accelerometers and magnetometers are mounted in the main plane of the buoy and are oriented along mutually perpendicular axes of that plane. The swell caused acceleration vector is perpendicular to the main plane (i.e. the free surface of the water). The accelerometer oriented perpendicular to the main plane measures the sum of the swell caused acceleration vector and the projection of the gravity vector along the axis of the buoy. The mutually perpendicular pair of accelerometers mounted in the main plane measure the projection of the gravity vector in the main plane of the buoy. The projection of the gravity vector along the axis perpendicular of the buoy are derived from the values of the gravity vector and of the gravity vector components in the main plane of the buoy. The value of the projection of the gravity vector is deducted from the value measured by the first accelerometer for obtaining the acceleration vector due to the swell.

5 Claims, 10 Drawing Figures

APPARATUS FOR MEASURING THE VERTICAL ACCELERATION DUE TO THE SWELL

The present invention relates to an apparatus for measuring the vertical acceleration due to the swell or ocean waves, the slope of the free sea surface, and the direction of the swell.

For measuring such parameters, it is necessary to have a rectangular-coordinate system which is fixed in the space and may be defined as follows:
- Oz axis is oriented as the vertical up-line of the spot, i.e. oriented as the plumb line;
- Oy axis is oriented towards the magnetic North, and
- Ox axis is oriented towards the magnetic East.

Present apparatus are known for measuring the swell parameters or ocean waves, which are based on two different principles. In one case, the measuring assembly is outside of the medium and, in the other case, it is included in the medium.

With respect to the apparatuses operating outside of the medium, three projects are presently under experiment. In the SEASAT project, a radar pulse is transmitted from a geostationary satellite, the backward pulse being analysed for recorvering the amplitude and the direction of the swell. In another project, an HF radar is used which transmits a radar pulse which is reflected by the water surface after having been reflected by the ionosphere. The amplitude and the direction of the swell must be determined by measuring and analysing the Doppler effect on that twice reflected pulse. A third project makes use of a direct radar which transmits a radar pulse directly towards the water surface. The reflected pulse is analysed to determine the amplitude and the direction of the swell.

When the measuring assembly is inside the medium, it is located in a buoy which is directly moved by the swell and which has three degrees of freedom. In such a case, the rectangular-coordinate system wherein the measure is made must be first defined. Two possibilities may be contemplated: the rectangular-coordinate system may be locked either to the vertical line or to the water surface.

In the vertical locking, a gyroscopic equipment may be locked on the vertical line of the spot. It is the most worked and explored solution. But, if it seems rather promising, it has the disadvantages of being heavy and consuming. The gravity may also be used for locking the rectangular-coordinate system to the vertical line. A spherical swell buoy is known which operates with an accelerometer mounted on a circular plate moving inside a sphere. The external reference is the gravity acceleration $\vec{g}$ which is oriented according to the vertical line at any spot of the globe. The locking is entirely dissociated from the measure of the swell acceleration. Thus the oscillation frequency proper to the movable equipment must be quite low with respect to the frequency band of the swell spectrum (0.1–60 s). In practice, if measuring and locking are physically separated, the detector must have a large size, the sphere must be filled up with a liquid such as glycerol, and the wire which supports the movable equipment must have very good mechanical characteristics. Such an equipment makes possible to measure the vertical acceleration vector of the swell only.

A purpose of the present invention is to provide a measuring apparatus in which the rectangular-coordinate system is locked to the sea surface, that apparatus making it possible to determine the vertical acceleration due to the swell, the slope of the free sea surface and the direction of the swell, while affording a number of advantages with respect to the existing equipments.

It may be said that, quantitatively, the measuring equipments operating outside of the medium make use of sophisticated techniques and materials, with an important personnel and an important budget.

Regarding the measures inside the medium, the gyroscopic lock buoys are generally bulky and, therefore, are not easy to utilize, more specially as they imply important reserves of energy. The system making use of the gravity, which has been the most worked for the last years, has, however, the disadvantage of giving only the vertical acceleration due to the swell.

In the present invention, a small-size and low consumption buoy is used, which makes it possible to obtain the parameters: vertical acceleration, slope and which direction of the swell, and has a number of advantages in the scientific field, for the study of the sea medium and the swell phenomenum, as well as in the technical field, for the knowledge of the stresses which the sea is subjected to.

According to a feature of the invention, an apparatus is provided for measuring the characteristics of the sea swell, which comprises a buoy of which the main plane follows the free surface of the water, an accelerator mounted on the axis of the buoy, two perpendicular accelerometers mounted in the main plane of the buoy, and a three-axis magnetometer.

According to another feature of the invention, the axis of the three-axis magnetometer are coincident with the axis of the accelerometers.

In addition to the detectors, the buoy carries the power supply and electronic material needed for processing, recording and/or transmitting the data relative to the swell.

The acceleration due to the swell is perpendicular to the free surface of the water. Thus, the accelerometer mounted on the buoy axis measures the sum of the acceleration due to the swell and the gravity acceleration projection $\vec{g}$ along the axis of the buoy.

The two orthogonal accelerometers mounted in the main plane of the buoy make it possible to measure the components of the vector projection $\vec{g}$ in that main plane. If the values of $\vec{g}$ and of the components of $\vec{g}$ in the main plane of the buoy are known, the vector projection $\vec{g}$ along the axis of the buoy may be derived therefrom. Then, this value is deducted from the value measured by the first accelerometer. The result is the value of the acceleration due to the swell.

The value of the projection of vector $\vec{g}$ along the buoy axis makes it possible to derive the angle of that axis with the vertical line, which directly provides the slope of the free surface of the water. From the value of the acceleration caused by the swell and from the value of the angle with the vertical line, the vertical acceleration caused by the swell may be derived.

The magnetometer makes it possible to determine the earth magnetic field vector with respect to the buoy. The direction of the swell is defined as the angle between the horizontal projection of the vector of the acceleration due to the swell and the horizontal projection of the magnetic field vector. The horizontal plane is defined with respect to the buoy if the vector $\vec{g}$ is known. It is thus possible to determine the direction of the swell.

The above mentioned features of the invention, as well as others, will appear more clearly from the following description of an embodiment, the description being made in conjunction with the accompanying drawings, wherein:

Figure 1:
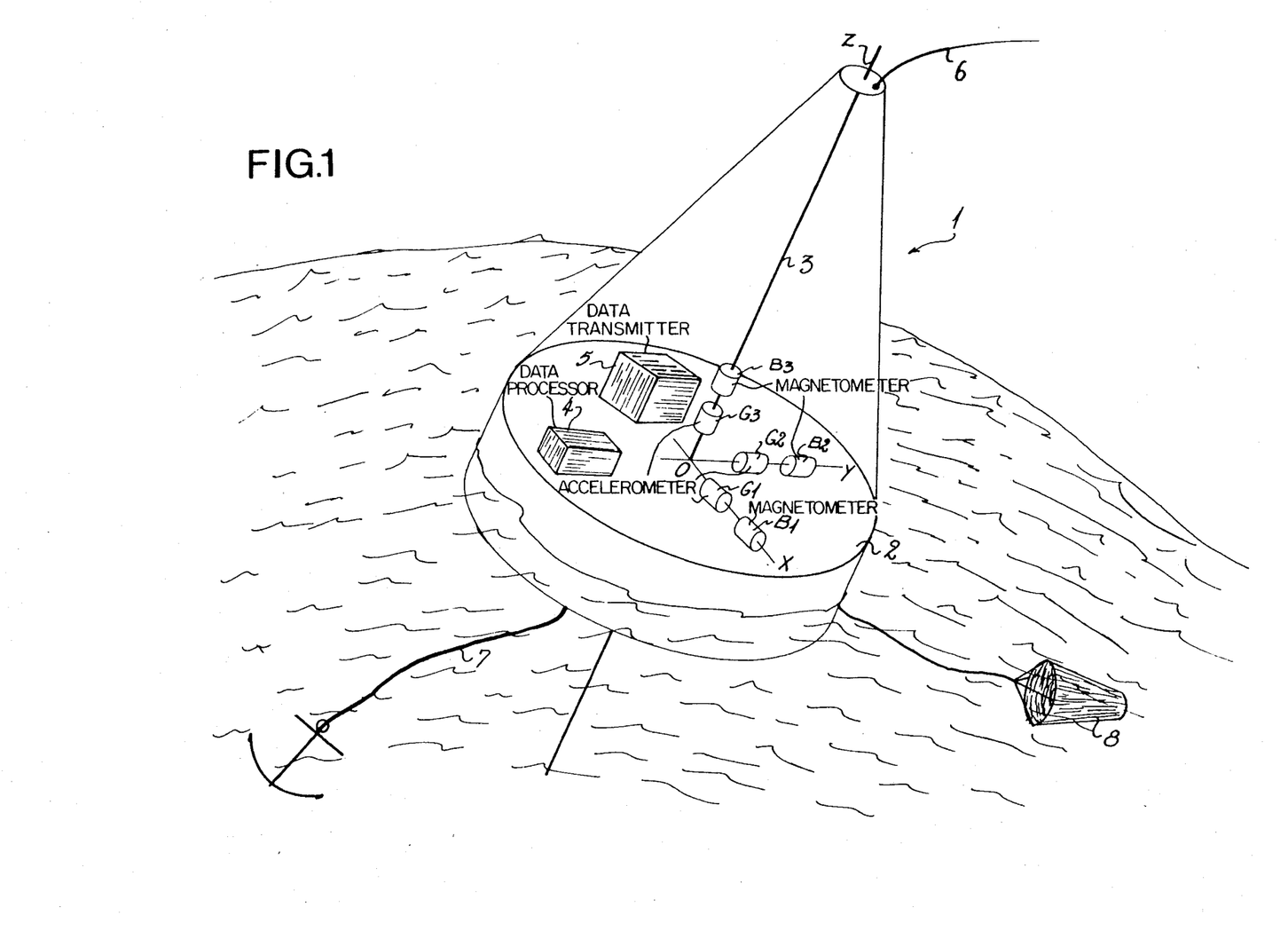
FIG. 1 is a perspective schematic view of an apparatus according to the invention, comprising a buoy.

Referring FIG. 1, the measuring apparatus comprises a buoy 1 that is essentially comprised of a floating disc 2 supporting a mast 3 oriented along the disc revolution axis. On the disc 2, are mounted three orthogonal accelerometers G1, G2 and G3, and three magnetometers B1, B2 and B3. The accelerometer G3 and the magnetometer B3 are oriented along axis Oz of the mast 3. The accelerometer G1 and the magnetometer B1 are oriented in the same direction Ox, and the accelerometer G2 and the magnetometer B2 are oriented in the same direction Oy. The directions Ox and Oy are in the plane of the disc 2 and also are perpendicular to each other. Also, the measuring apparatus comprises an electronic cabinet 4 which contains the power supplies for operating the accelerometers and the magnetometers. The recorded signals are processed in a digital processor which may be located within the cabinet or remotely located. Last, the apparatus comprises a data transmitter 5 connected to an aerial 6 mounted at the top of the mast 2. When the data processor is mounted within the cabinet 4, the data transmitted from 5 are those delivered from the processor. When the processor is remote located, the data to be transmitted are delivered from the individual recording circuits.

Figure 2:
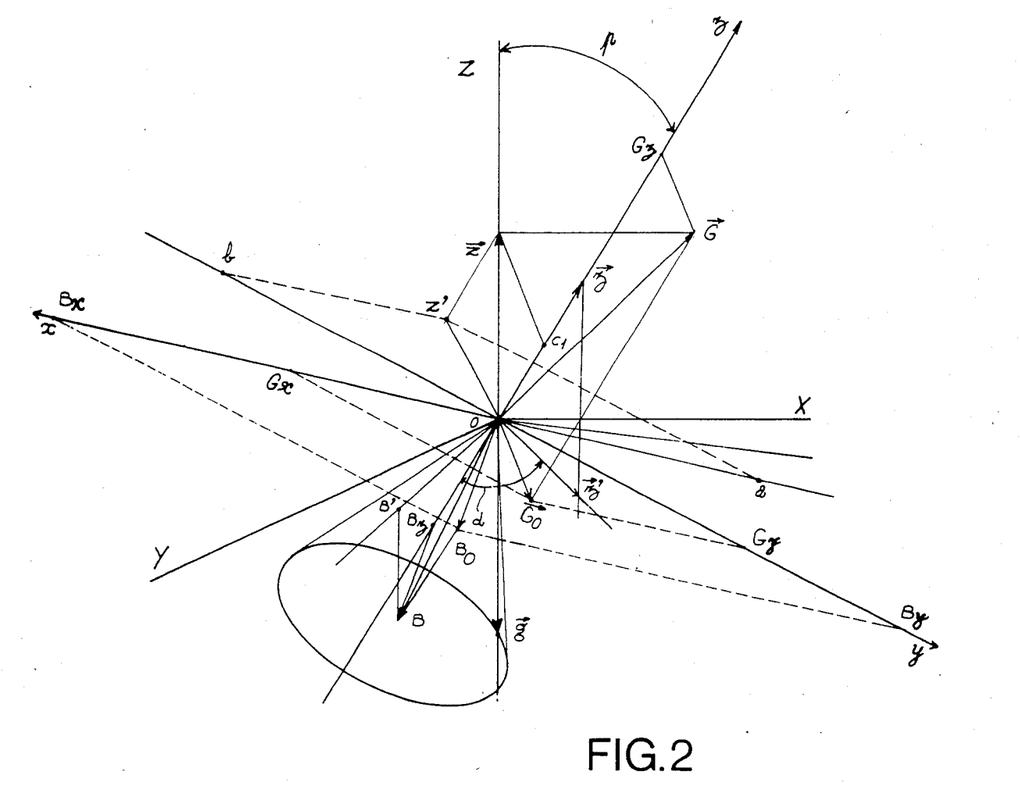
FIG. 2 is a geometrical diagram illustrating the operation of the measuring apparatus.

Since the accelerometers G1, G2, G3 are fixed to the buoy, the values they supply are related to the rectangular-coordinate system Ox, Oy, Oz, FIG. 2, which is inherently a mobile reference system. The measurements related to the mobile reference system Ox, Oy, Oz are converted into measurements related to an absolute reference rectangular-coordinate system OX, OY, OZ, FIG. 2, wherein axis OZ is coincident with the vertical line at the anchoring spot of the buoy. To make this conversion an auxiliary reference is used, which is the magnetic field vector $\vec{B}$ assumed to be defined at the anchoring spot, such a vector being measured by the magnetometers B1, B2, B3 fixed in the mobile reference system Ox, Oy, Oz.

In the buoy 1, shown in FIG. 1, the mass of the floating disc 2 is preponderant with respect to the sum of the masses of the other components of the buoy. The buoy follows the profile of the free surface of the sea; such a fact is taken into account as will appear in the following specification.

As it is to be expected, it will be assumed that the acceleration of the free surface of the water, and thus of the center O of the buoy, is always in the vertical plane containing the direction of the line having the greatest slope at the free surface.

In the geometrical diagram shown in FIG. 2, the following vectors and angles are indicated:

$\vec{G}x$ representing the acceleration measured by accelerator G1, $\vec{G}y$ representing the acceleration measured by accelerator G2, $\vec{G}z$ representing the acceleration measured by accelerator G3, $\vec{G}$ representing $(\vec{G}x + \vec{G}y + \vec{G}z)$ $\vec{g}$ representing the gravity acceleration, oriented in the negative direction along axis OZ, $\vec{h}$ representing the difference $(\vec{G} - \vec{g})$, i.e. the acceleration of the free surface at the point O, $\vec{B}x$ representing the magnetic field component measured by magnometer B1, $\vec{B}y$ representing the magnetic field component measured by magnometer B2, $\vec{B}z$ representing the magnetic field component measured by magnometer B3, $\vec{B}$ representing the sum $(\vec{B}x + \vec{B}y + \vec{B}z)$, i.e. the magnetic field at the point O, $\vec{B'}$ representing the projection of $\vec{B}$ on the horizontal plane OX, OY, p representing the angle between $\vec{Oz}$ and $\vec{OZ}$, $\vec{Oz'}$ representing the projection of $\vec{Oz}$ on the horizontal plane OX, OY, d representing the angle between $\vec{Oz'}$ and $\vec{B'}$.

The following conventional signs have been chosen for the calculations:

OZ and Oz are positively oriented upwards which does not involve any limitation since the absolute value of the slope p is limited to a value which is less than 90°, the horizontal plane OX, OY is oriented in the trigonometric direction derived from the orientation of axis OZ, and the vertical plane containing the direction of the swell is oriented by axis OZ and an axis positively oriented in the direction of the swell.

As it will be seen in the following, the values of the vector $\vec{G}x$, $\vec{G}y$, $\vec{G}z$, $\vec{B}x$, $\vec{B}y$, $\vec{B}z$, $\vec{B}$, $\vec{B'}$ and g will make possible to successively calculate in the rectangular-coordinate system Ox, Oy, Oz related to the buoy:

$\vec{Z}$ representing the unitary vector of the ascending vertical line of the place, $V_z$ representing the vertical speed of the buoy, with its sign, p° representing the absolute value of the slope of the swell, p as hereabove defined, z' representing the projection of the unitary vector $\vec{z}$ of Oz, on the horizontal plane OX, OY of the place, $\vec{B'}$ as hereabove defined, d° representing the absolute value of the angle of $\vec{B'}$ on $\vec{z'}$, and d as hereabove defined.

It will be seen that, in practice, the calculation of Z results in two solutions.

Figure 3:
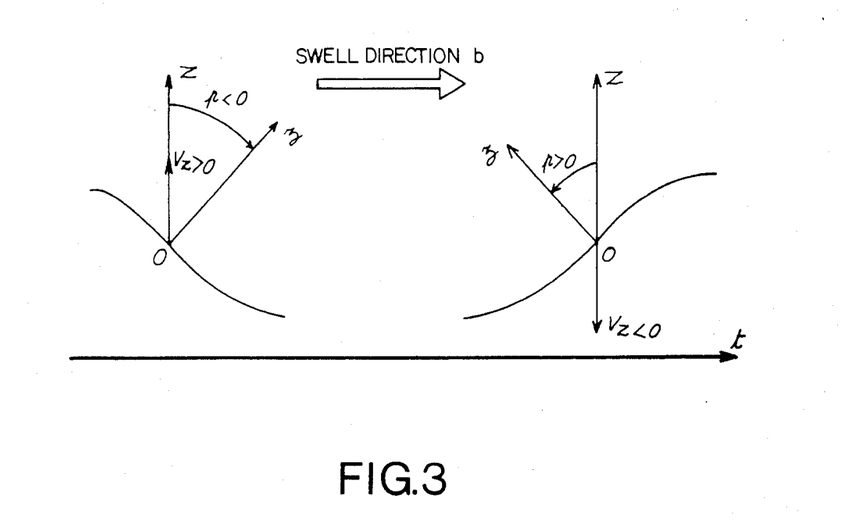
FIG. 3 is a graph illustrating one aspect of the operation of the measuring apparatus.

Referring to FIG. 3, two successive conditions a and b of the buoy are illustrated, the condition a occuring later than the condition b, that being implicitly indicated by the direction of the arrow "swell direction":

(1) when $V_Z > 0$, then $p < 0$ the buoy going up before it passes at the crest where $p = 0$, (2) when $V_Z < 0$, then $p > 0$ the buoy going down before it passes at the trough where $p = 0$.

Furthermore, the direction of the swell d, i.e. the direction which the swell is coming from, will be:

(1) $d = (\vec{B'}, \vec{z'})$, when $p > 0$, i.e. $V_Z < 0$, and (2) $d = (\vec{B'}, \vec{z'}) + \pi$, when $p < 0$, i.e. $V_Z > 0$.

Considering the bearing or magnetic heading of the direction from which the swell is coming the result will be:

(1) $d = (\vec{B'}, \vec{z'})$, when $V_Z < 0$, and (2) $d = -(B', z') - \pi$, when $V_Z > 0$,
because the bearings are counted along the direction opposite to the trigonometric direction in the horizontal plane OX, OY.

The sign of $V_Z$ being known, the sign indeterminations on p and $\pi$ of on d are cleared, those indeterminations being unavoidable since there is no privileged direction in the arrangement of the accelerometers and the magnetometers.

The calculations of the coordinates a, b, c of the vector $\vec{Z}$ in the trihedral Ox, Oy, Oz will now be described.

The following equations result:

$$a^2 + b^2 + c^2 = 1 \quad (1)$$

$$\frac{-\vec{Z}.\vec{B}}{B} = \cos A \text{ because } (-\vec{Z}, \vec{B}) = A,$$

where A is the constant angle between the vertical line of the spot and the earth magnetic field, B is the constant modulus of the magnetic field, A and B depending on the anchoring spot only.

Furthermore, $\vec{Z}$, $\vec{G}$ and $\vec{z}$ being coplanar, then:

$$\vec{Z}(\vec{G} \wedge \vec{z}) = 0.$$

This equation when developed gives, with (1):

$$a^2 + b^2 + c^2 = 1 \quad (1)$$

$$a.Bx + b.Bx + c.Bz = -B.\cos A \quad (2)$$

$$a.Gy - b.Gx = 0 \quad (3)$$

resulting in:

$$a = \lambda\ Gx \quad (4)$$

$$b = \lambda\ Gy$$

$$c = -\frac{B.\cos A}{Bz} - \lambda.\frac{Bx.Gx + By.Gy}{Bz}$$

The values a, b, c of the equation (1) being replaced by their values in the system (4), the solution of the hereunder equation (5) gives the parameter $\lambda$:

$$0 = \lambda^2 \left[ (Gx^2 + Gy^2) + \left( \frac{Bx.Gx + By.Gy}{Bz} \right)^2 \right] + \quad (5)$$

$$2\lambda.\frac{B.\cos A(Bx.Gx + By.Gy)}{Bz^2} - \left( 1 - \frac{B^2.\cos^2 A}{Bz^2} \right)$$

With:

$$Go = (Gx^2 + Gy^2)^{\frac{1}{2}}$$

$$K = (Bx.Gx + By.Gy).Bz^{-1}$$

$$L = B.\cos A.Bz^{-1}$$

equation (5) becomes:

$$\lambda^2(Go^2 + K^2) + 2\lambda LK - (1 - L^2) = 0$$

and then:

$$c = -(L + \lambda K)$$

The $\lambda$ equation (5) is thus a quadratic equation which has two roots: $\lambda_1$ et $\lambda_2$, defining two vectors $\vec{Z_1}(a_1, b_1, c_1)$ and $\vec{Z_2}(a_2, b_2, c_2)$. Such a double solution is understandable in geometry, because Z results from the intersection of a plane containing $\vec{G}$ et $\vec{z}$, with the cone defined by axis B and aperture A.

It will be noted that Go, K and L are calculated from the measurements made by accelerometers G1, G2, magnometers B1, B2, B3, while B and A are already known. Therefore, it is quite possible to calculate the values of.

For obtaining the value of the slope p, the vertical speed of the buoy will first be calculated by taking into account the values related to the rectangular-coordinate system defined by the root $\vec{Z_1}$ of equation (5).

$$V_{Z1} = \int_0^+ \vec{Z_1}.(\vec{G} - \vec{g})dt$$

or:

$$V_{Z1} = \int_0^+ (a_1.Gx + b_1.Gy + c_1.Gz + g)dt$$

because $\vec{g}$ is oriented downwards, or also:

$$V_{Z1} = \int_0^+ [\lambda_1.Gx^2 + \lambda_1.Gy^2 - (L + \lambda_1.K).Gz + g]\ dt$$

or:

$$V_{Z1} = \int_0^+ [\lambda_1(Go^2 - K.Gz) - L.Gz + g]dt \quad (6)$$

The equation (6) provides the sign of $V_{Z1}$ and, on the other hand, $c_1$ is equal to $-(L + \lambda K)$, therefore:

$$p_1 = -(\text{sign } V_{Z1})\ \text{Arc cos } c_1$$

It can be noted that $c_1$ and $c_2$ are always positive since the absolute value is lower than 90°. Furthermore, equations (4) and (1), also give the results:

$$c_1 = (1 - \lambda_1^2.Go^2)^{\frac{1}{2}}$$

Of course, the last calculations on $\lambda_1$ are also convenient for calculating $\lambda_2$.

The projection $\vec{z'_1}$ of $\vec{z}$ on the horizontal plane OX1, OY1, defined by $\vec{Z_1}$, will now be calculated:

$$\vec{z'_1}.\vec{Z_1} = 0$$

$$(\vec{z} - \vec{z'_1})\ \vec{Z_1} = 0$$

or, with $\vec{z'_1}(\alpha_1, \beta_1, \gamma_1)$, $$\alpha_1.a_1 + \beta_1.b_1 + \gamma_1.c_1 = 0 \quad (8)$$

$$\alpha_1.b_1 - a_1.\beta_1 = 0$$

$$a_1(\gamma_1 - 1) - \alpha_1 c_1 = 0 \quad (9)$$

$$\beta_1 c_1 - b_1(\gamma_1 - 1) = 0$$

which results in:

$$z'1 \begin{cases} \alpha 1 = -a1.c1 \\ \beta 1 = -b1.c1 \\ \gamma 1 = 1 - c1^2 = a1^2 + b1^2 \end{cases}$$

The projection $\vec{B'1}$ of $\vec{B}$ on the horizontal plane defined by $\vec{z1}$ may be written as:

$$\vec{B'1} = \vec{B} + \vec{Z1}.B.\cos A$$

because B and Z1 are opposite in direction, i.e.:

$$\vec{B'1} \begin{cases} Bx + a1.B.\cos A \\ By + b1.B.\cos A \\ Bz + c1.B.\cos A \end{cases}$$

The oriented angle $(\vec{B'1}, \vec{z'1})$ that be defined, for instance, by its cosine or its sine sign, will now be calculated.

Here the sign of the sine will be given by the sign of the vectorial product $\vec{B'1} \wedge \vec{z'1}$, along axis OZ1. Then $$\cos |\vec{B'1}, \vec{z'1}| = \frac{\alpha 1.(Bx + a1.B.\cos A) + \beta 1.(By + b1.B.\cos A) + \gamma 1.(Bz + c1.B.\cos A)}{||\vec{z'1}|| \cdot ||\vec{B'1}||}$$

with: $||\vec{B'1}|| = B.\sin A$ and $||\vec{z'1}|| = (a1^2 + b1^2)^{\frac{1}{2}}$ from which, all the calculations being made and equation (2) being taken into account, it results:

$$\cos |\vec{B'1}, \vec{z'1}| = \frac{Bz + c1.B.\cos A}{B.\sin A.(1 - c1^2)^{\frac{1}{2}}}$$

Furthermore:

$$\text{sign } (\vec{B'1} \wedge \vec{z'1}) = \text{sign } [\beta 1(Bx + a1.B.\cos A) - \alpha 1.(By + b1.B.\cos A)]$$

$$= \text{sign } [\lambda 1.c1.(Gx.By - Gy.Bx)]$$

It will be noted that the cosine is also simply expressed as:

$$\cos (\vec{B'1}, \vec{z'1}) = + \frac{Bz + c1.B.\cos A}{\lambda 1.Go.B.\sin A} \text{ when } \lambda 1 > 0$$

$$= - \frac{Bz + c1.B.\cos A}{\lambda 1.Go.B.\sin A} \text{ when } \lambda 1 < 0$$

The value of d may then be derived from the above calculations, as above mentioned.

It is obviously necessary to elect, between the two roots of equation (5) the one that gives the correct vertical line of the anchoring spot. Strictly speaking, it is not possible to make the selection from only the measured parameters, without introducing other physical considerations by another measurement, for instance the measurement of the wind.

However, preliminary observations allow the invention to distinguish between the two roots from the parameter L.

Indeed, $L = (B.\cos A).Bz^{-1}$ is always negative when the swell slope remains lower than $(90° - A)$, which would correspond the the case of a not very rough sea.

Furthermore, with $L = L'$ and when $L' < 1$, then:

$$\lambda 1 \lambda 2 = -\frac{1 - L^2}{Go^2 + K^2} < 0$$

when $\beta 1 = |\vec{B'1}, \vec{z'1}|$ corresponds to the first root and $\beta 2 = |\vec{B'2}, \vec{z'2}|$ to the second root, one can verify that for the two roots the vertical speed $V_Z$ have opposite signs an and election may be made of:

$$d1 = -\beta 1$$

and $$d2 = -(\beta 2 + \pi)$$

with in any case, $d1 + d2 = \pi$.

When $L' > 1$, then $\lambda 1.\lambda 2 > 0$, $\lambda 1$ and $\lambda 2$ both having the sign of K. One can verify that p1 and p2 have the same sign, as well as the vertical speeds $V_{Z1}$ and $V_{Z2}$. Furthermore:

$$d1 = -\beta 1 \qquad d1 = -\beta 1 - \pi$$

or $$d2 = -\beta 2 = +\beta 1 - \pi \qquad d2 = -\beta 2 - \pi = 1$$

Now when $\lambda 1 > \lambda 2$, it may be positively stated, by continuity when the correct root is $\lambda i$, that root remains correct until the equation (5) has a double root, i.e. for:

$$(KL)^2 = -(1 - L^2).(Go^2 + K^2)$$

Such a condition is possible only when $L' > 1$.

On the other hand, it is known that the vertical speed must be substantially nil when the buoy itself is vertical, i.e. on either a crest or a trough.

Therefore the buoy is vertical when the true vertical line OZi is in coincidence with Oz. At that time:

$$L = B.\cos A.Bz^{-1} = -1.$$

Conversely, there are two roots when $L = -1$:

$$\lambda_i = 0, \text{ and}$$

$$\lambda_j = \frac{2K}{Go^2 + K^2}$$

$\lambda j$ having the sign of K. When $\lambda i$ is the good root, Ozi is the exact vertical line on the spot; when $\lambda j \neq 0$ is the good root, Ozj is the second intersection of the cone (B, A) with the vertical plane containing the direction of the swell.

Thus it may be understood that, in the cycle of a wave, the parameter L may vary according two different modes:

| mode No. 1 |
|---|
| $L' > 1$, Oz is inclined towards the South sector |
| phase 0+    $L' = 1$, Oz is crossing the vertical line, |
| $L' < 1$, Oz is inside the cone (B, A) |
| phase 0−    $L' = 1$, Oz is crossing the vertical line in the opposite direction. |
| mode No. 2 |
| $L' > 1$, Oz is inclined towards the South sector, |

-continued

| phase $0_+$ | $L' = 1$, Oz is crossing the vertical line, |
| | $L' < 1$, Oz being inside the cone, |
| phase $2_+$ | $L' = 1$, Oz is crossing OZj "up", |
| | $L' > 1$, |
| phase $2_-$ | $L' = 1$, Oz is crossing OZj in the opposite direction, |
| | $L' < 1$, Oz being inside the cone, |
| phase $0_-$ | $L' = 1$, Oz is crossing the vertical line in the opposite direction. |

One or the other motion mode will be the good one, depending on the sea condition and swell direction. Even in a light seas condition, the second root is the most probable as the well direction turns toward EAST or WEST whichever is closest. Of course, L' is permanently equal to 1 for a swell coming directly from the EAST or WEST.

In the calculations, the phase $0_{(\pm)}$ will be distinguished from the phase $2_{(\pm)}$ through $V_{Zj}$. Indeed, in phase 2, a speed $V_{Zj}=0$ will be found for the value $\lambda=0$, while a speed $V_{Zj}\neq 0$ will be found in phase 0.

Thus the root will be searched in such a way that, at time t0:

$L'=1$, for $t=t0$ $L'>1$, for $t<t0$ $L'<1$, for $t>t0$ $\lambda i = 0$ $V_{Zi}=0$ Then the correct root for the period $L'<1$ is the one which is related to the so predetermined value $\lambda i$. It is also the root for the preceding period (L' 1), save when $\Delta = K^2 L^2 + (1-L^2) \cdot (Go^2 + K^2)$ has become nil, giving a double root to equation (5).

That procedure becomes ineffective when $L'=1$ and $\Delta=0$ simultaneously. But those equalities lead to $K=0$, indicating that the projections of B and G on the plane OXY are orthogonal, that plane being the horizontal plane at this time, which also means that B' and Go are orthogonal. Therefore, during the entire cycle, the swell comes from either the EAST or the WEST, and $\lambda 1 = \lambda 2$.

It may also be settled that a change of root will be possible only when the instantaneous direction of the swell will pass through the EAST or WEST. Then a check of L' crossing the value 1 will make it possible to clear the correct root for the period following $\Delta$ crossing zero.

Before describing a flow diagram for determining p and d from the above considerations and equations, a number of possible simplifications in those equations will be stated assuming that the acceleration vector $\vec{h}$ is perpendicular to the free sea surface. That hypothesis is based upon the theory stating that the acceleration $\vec{h}=d\vec{V}/dt$ is perpendicular to the profile of the free sea surface, according to Bernouilly. Since that profile is an isobar, the speed in such an isobar is tangential to the free sea surface at any point.

In such a case, at any time, the measures are:

$$\vec{G} = \vec{g} + \vec{h} = -g.\vec{Z} + h.\vec{z},$$

$$Gx = -ag$$

i.e. $Gy = -bg$ $$Gz = -cg + h$$

It is clear that that leads to one root only for a, b and c. It corresponds to the root $\lambda = -1/g$.

The swell slope may be estimated with the accelerometer indications only, because:

$$c = +\sqrt{1-(a^2+b^2)} = \sqrt{1 - \frac{Gx^2 + Gy^2}{g^2}}$$

$$V_{Z(t)} = \int_0^+ \vec{h}.\vec{Z}.dt = \int_0^+ c.(Gz + cg).dt$$

i.e.
$p(t) = -(\text{sign of } V_{Z(t)}) \text{ Arc cos } c$
or
$p(t) = -(\text{sign of } V_{Z(t)}) \text{ Arc sin } (Gx^2 + Gy^2)^{\frac{1}{2}}/g$ The swell direction is then given, within the interval $(-\pi, +\pi)$, by:

$$\cos d = -g \frac{Bz + c.B.\cos A}{Go.B.\sin A} \text{ when } V_Z > 0$$

$$\cos d = +g \frac{Bz + c.B.\cos A}{Go.B.\sin A} \text{ when } V_Z < 0$$

with sign of $d = $ sign of $(Gy.Bx - Gx.By)$

It must be noted that, with such a simplifying hypothesis, $\overrightarrow{Bx}$ and $\overrightarrow{By}$ are no longer used in the calculations, i.e. the components of $\vec{B}$ in a plane perpendicular to the axis of the buoy. If the values $\overrightarrow{Bx}$ and $\overrightarrow{By}$ are measured, a check can be made for proving the simplifying hypothesis. From the above equation (4), it results that $\overrightarrow{Bx}$ and $\overrightarrow{BY}$ must verify the following equation:

$$Bx.Gx + By.Gy = g. \left( B.\cos A + Bz. \sqrt{1 - \frac{Gx^2 + Gy^2}{g^2}} \right)$$

Figure 4A:
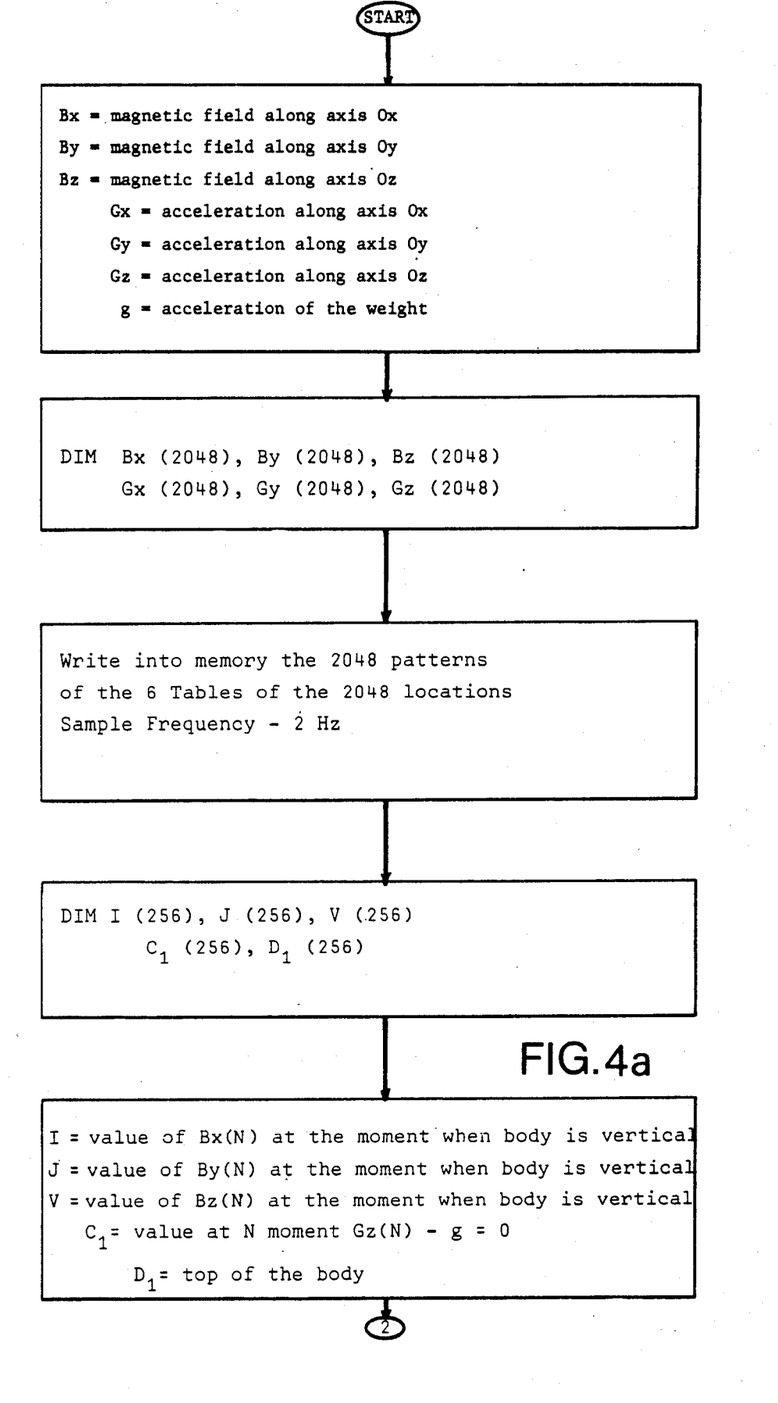
FIGS. 4a-4g are a flow diagram which illustrates the operation of the processor of the measuring apparatus.
Figure 4B:
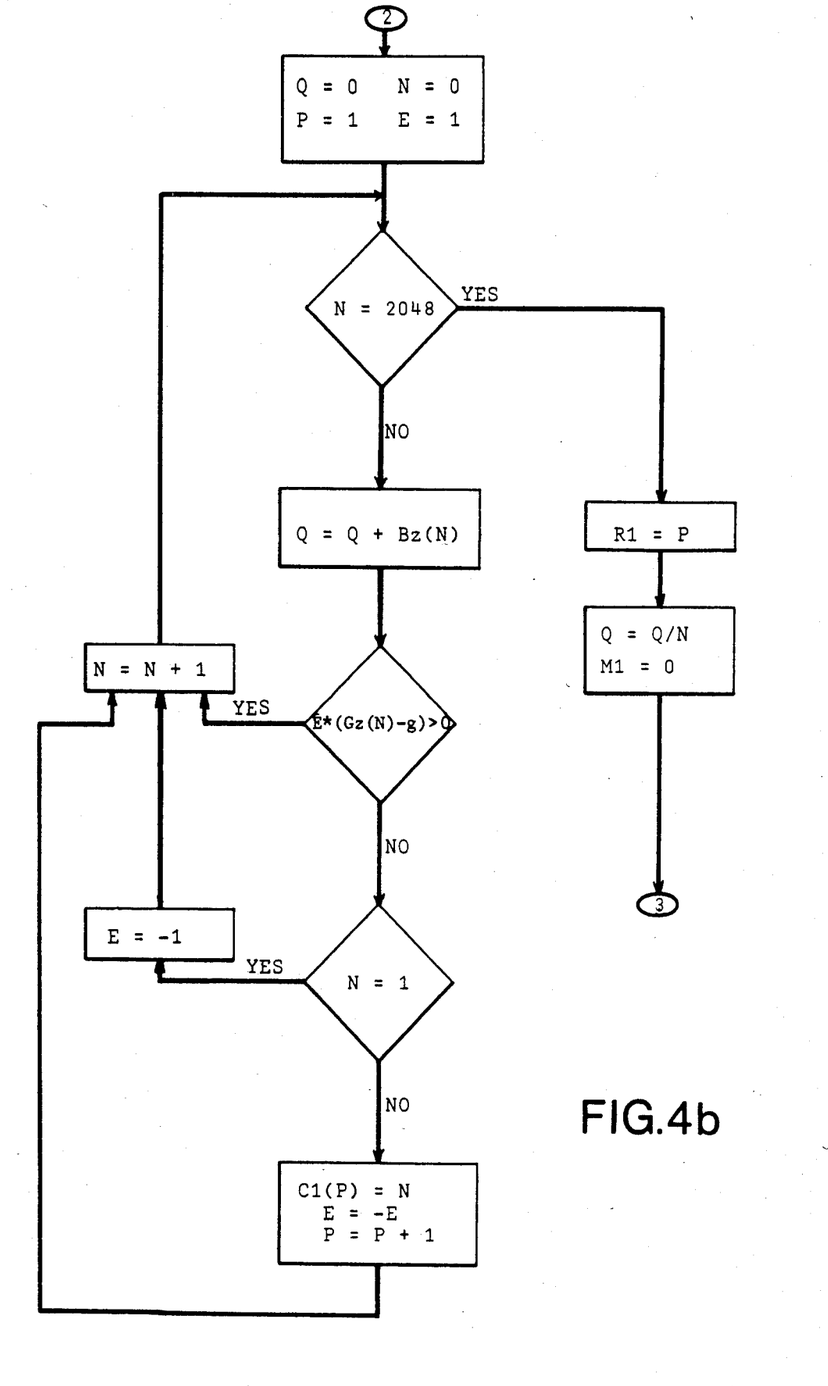

The flow diagram of the FIG. 4b indicates how the ranks N of the stored samples are derived, when the buoy is on a crest or in a trough, from the difference between the projection of the acceleration G that the buoy undergoes and the gravity. The value R1 gives the number of swell crests and troughs which occur during the twenty recording minutes. The value Q is equal to the average value of the vertical projection of the magnetic field.

Figure 4C:
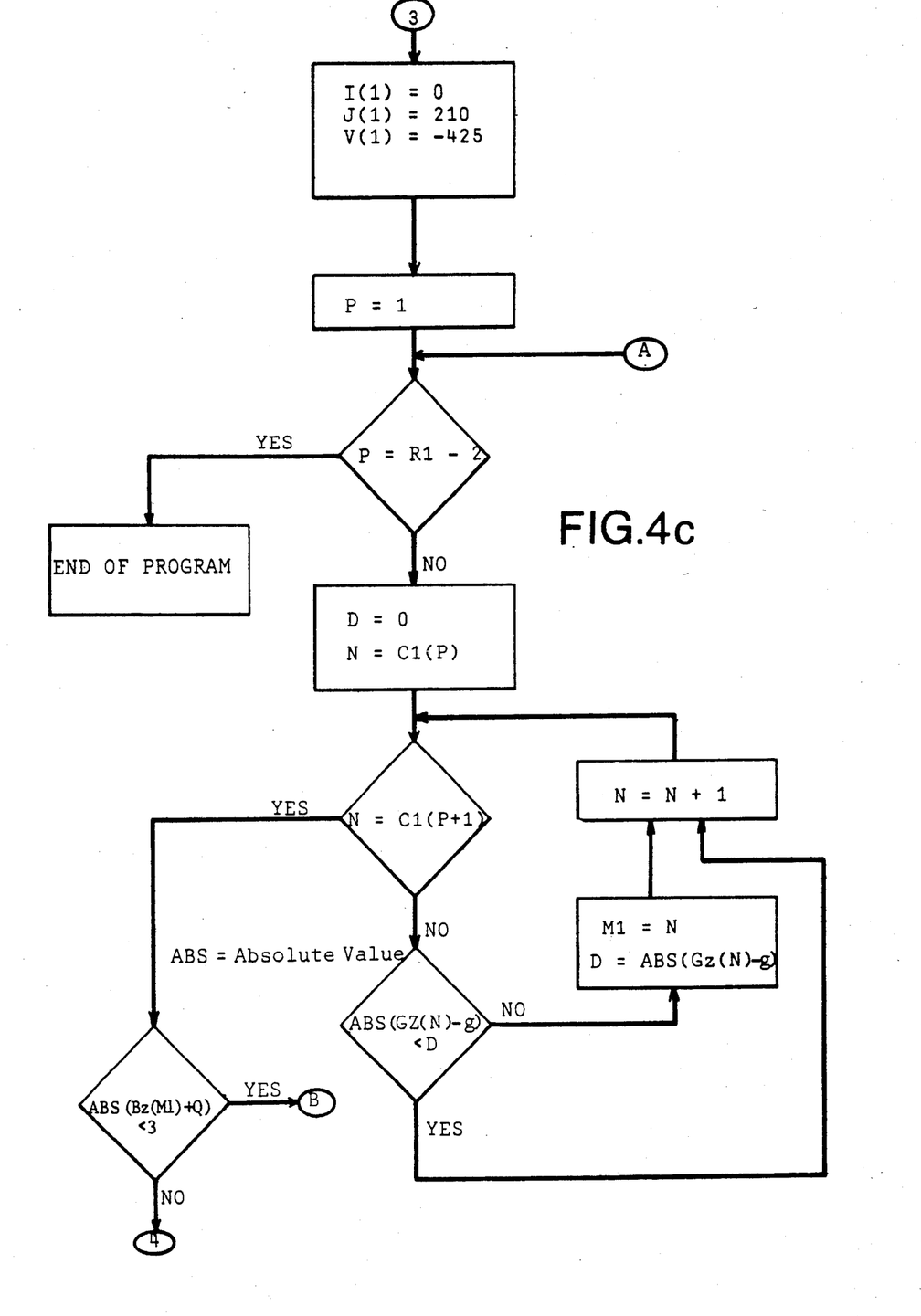

The flow diagram of FIG. 4c defines, with some uncertainty, when the vertical acceleration is null, with the vertical projection of the magnetic field on the axis of the buoy being equal to the projection of the field on the vertical line, when the buoy is vertical.

Figure 4D:
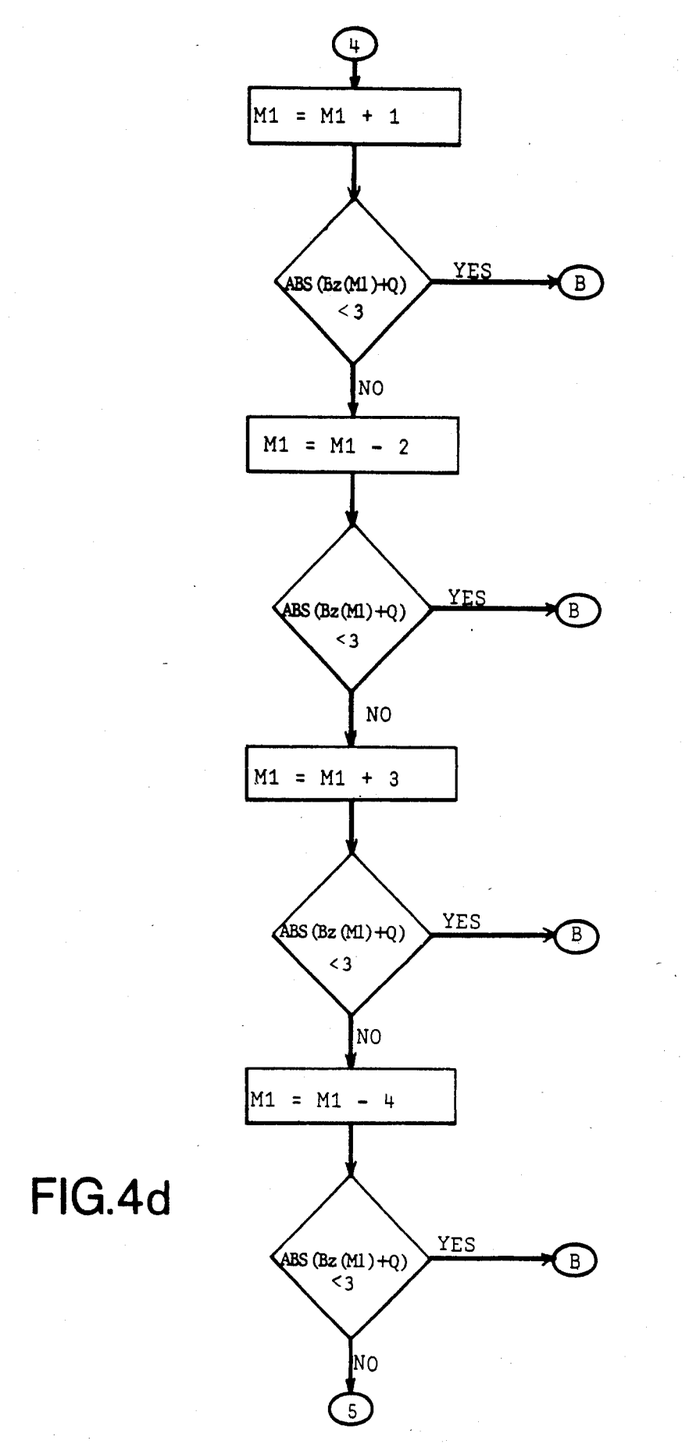

The flow diagram of FIG. 4d analyzes how the difference between said projections varies about a high or low point.

Figure 4E:
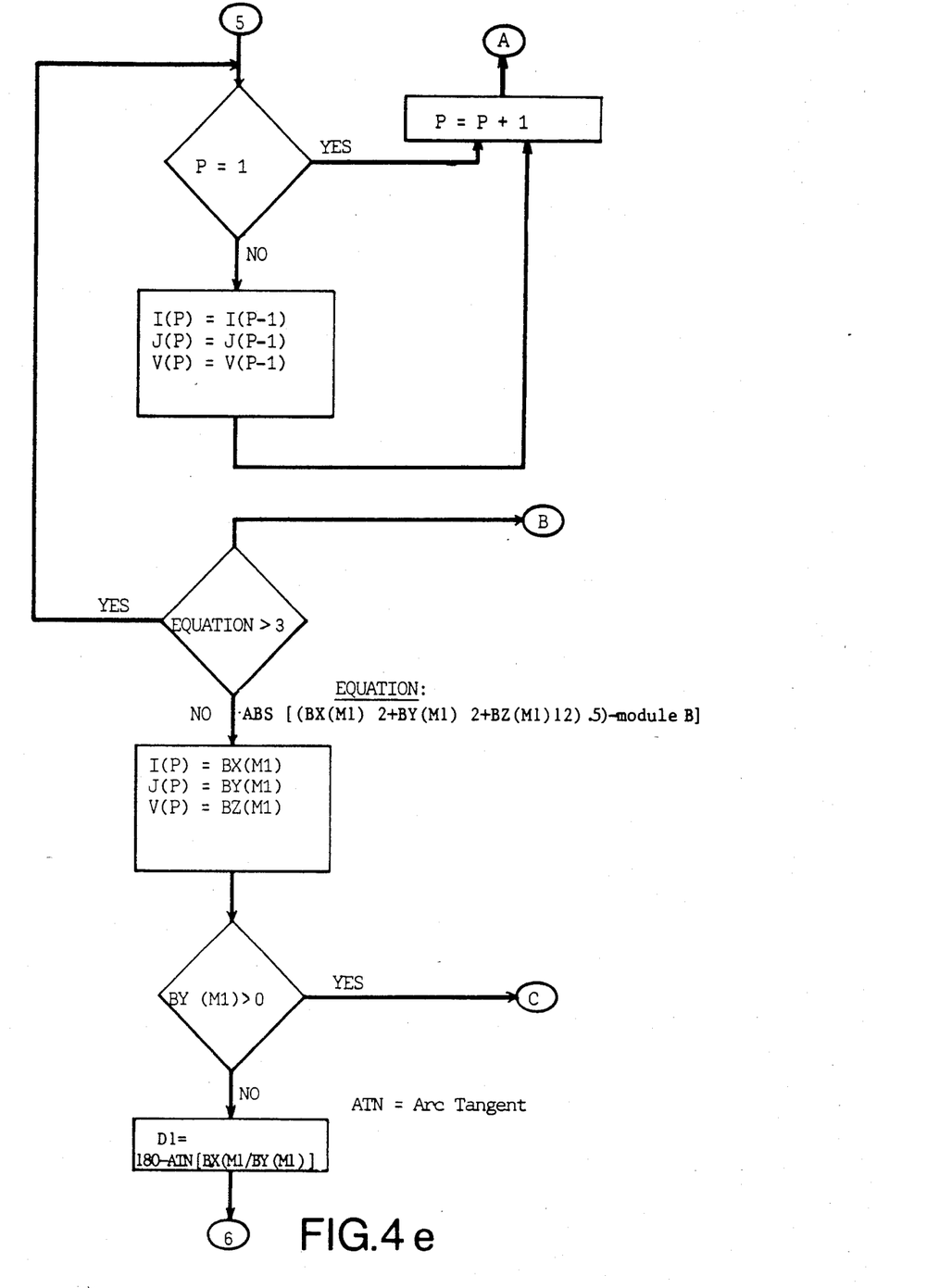
Figure 4F:
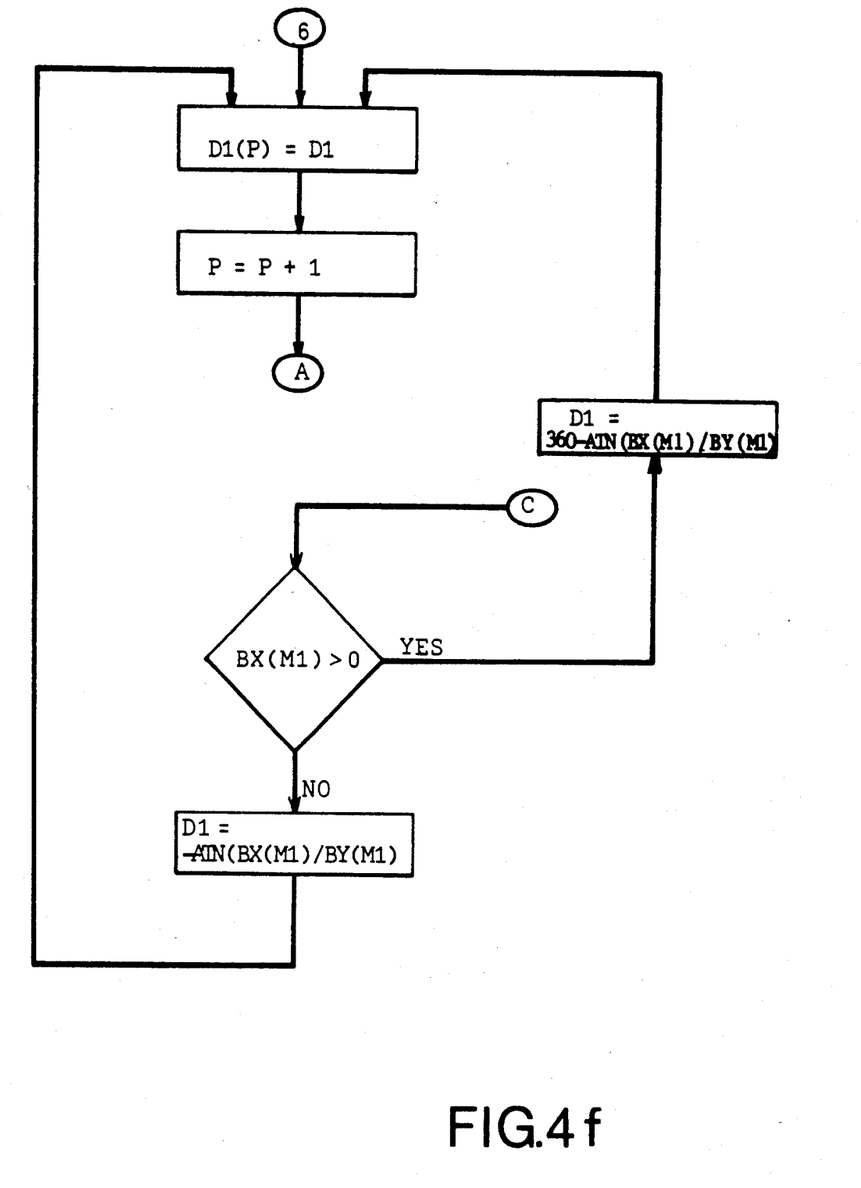

The flow diagram of FIGS. 4e and 4f make it possible to remove the uncertainty of 180°, and to determine the angle corresponding to the tangent defined by the projections of the magnetic field on the axis Ox and Oy which are always horizontal on a crest or in a trough.

Figure 4G:
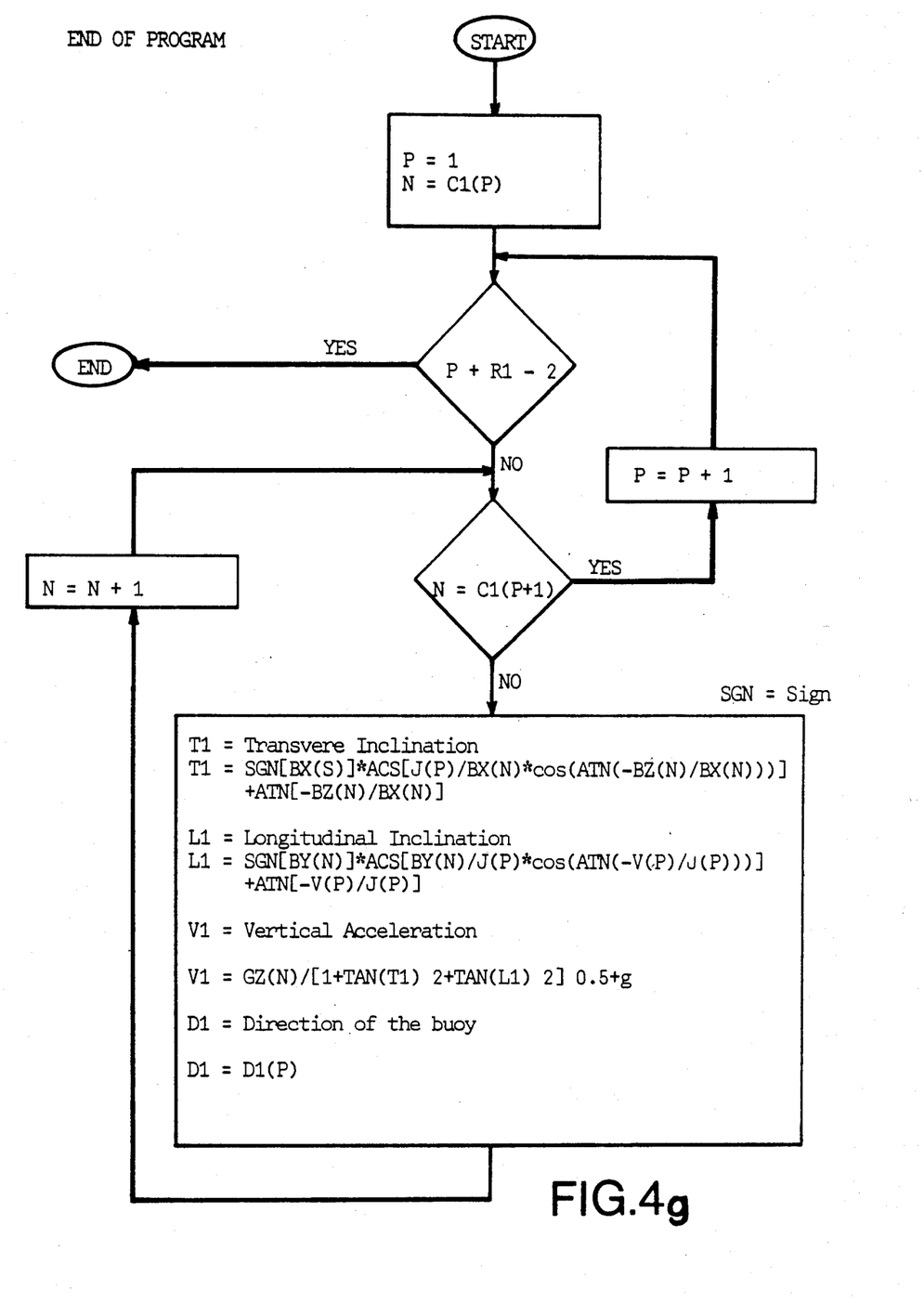

Referring to FIG. 4g, the output data are defined, i.e. T1 and L1 which are the direction D1 corresponding to d. It will be noted that the intermediary variables I, J and V are used, these variables being defined in the flow diagram of FIG. 4a.

At last, the buoy 1 is obviously anchored, that being indicated by the buoy-rope 7. The orientation of the buoy is stabilized by a floating anchor 8.

I claim:

1. Apparatus with accelerometers and magnetometers for measuring the surface characteristics of a sea swell, said apparatus comprising a floating buoy having a main plane which follows the free surface of the water, first accelerometer means mounted on the buoy and oriented along an axis which is perpendicular to the main plane of the buoy, a pair of mutually perpendicular accelerometer means mounted in the main plane, and three magnetometer means, one of said magnetometer being mounted along and coincident with individually associated ones of each of the three axes of the accelerometers, data processor means coupled to be driven by said accelerometers and magnetometers, said data processor means including means for deriving an acceleration vector (h) perpendicular to the free surface of the water responsive to the swell, finding the sum of the acceleration vector (h) due to the swell and the projection of the gravity vector (g) along the axis of the buoy responsive to the accelerometer oriented perpendicular to the main plane, measuring the components of the projection of the gravity vector (g) in the main plane of the buoy responsive to the mutually perpendicular pair of accelerometers mounted on the main plane of the buoy, finding the projection of the gravity vector (g) along the axis perpendicular of the buoy responsive to the value of the gravity vector (g) and the values of the gravity vector components of (g) in the main plane of the buoy, and giving the value of said projection of the gravity vector responsive to the value measured by the first accelerometer for obtaining the value of the acceleration vector (h) due to the swell.

2. Apparatus according to claim 1, and said data processor means includes means responsive to the value of the projection of the gravity vector g along the axis perpendicular to the main plane of the buoy for deriving the angle of said axis with respect to a vertical line thus directly giving the slope of the free surface of the water.

3. Apparatus according to claim 2, wherein said data processor means includes means responsive to the value of the acceleration vector (h) due to the swell and to the angle of the axis with respect to the vertical line for deriving the vertical acceleration due to the swell.

4. Apparatus according to claim 2, wherein said data processor means includes means responsive to the values measured by the accelerometers for deriving the projection on the horizontal plane of the axis perpendicular to the main plane of the buoy fixed by gravity, and means responsive to the values measured by the magnetometers for deriving the projection of the magnetic field vector B on the horizontal plane fixed by gravity, the angle between said projections giving the direction of the swell.

5. Apparatus according to any one of claims 1 to 4, wherein the body of the buoy (1) is essentially made of a flat disc (2).

* * * * *